United States Patent
Jin et al.

(10) Patent No.: US 11,296,385 B2
(45) Date of Patent: Apr. 5, 2022

(54) BATTERY MODULE AND BATTERY PACK

(71) Applicant: Contemporary Amperex Technology Co., Limited, Ningde (CN)

(72) Inventors: Haizu Jin, Ningde (CN); Linggang Zhou, Ningde (CN); Peng Wang, Ningde (CN); Dongyang Shi, Ningde (CN); Xingdi Chen, Ningde (CN); Fei Hu, Ningde (CN); Fenggang Zhao, Ningde (CN); Yanhuo Xiang, Ningde (CN); Yongshou Lin, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 17/353,933

(22) Filed: Jun. 22, 2021

(65) Prior Publication Data

US 2021/0313644 A1  Oct. 7, 2021

Related U.S. Application Data (63) Continuation of application No. PCT/CN2019/076271, filed on Feb. 27, 2019.

(30) Foreign Application Priority Data

Dec. 29, 2018 (CN) .......................... 201811641703.7

(51) Int. Cl.
| | |
|---|---|
| *H01M 50/209* | (2021.01) |
| *H01M 10/613* | (2014.01) |
| *H01M 10/6556* | (2014.01) |
| *H01M 50/533* | (2021.01) |
| *H01M 50/591* | (2021.01) |

(52) U.S. Cl.
CPC ....... *H01M 50/209* (2021.01); *H01M 10/613* (2015.04); *H01M 10/6556* (2015.04); *H01M 50/533* (2021.01); *H01M 50/591* (2021.01)

(58) Field of Classification Search
CPC ............ H01M 50/209; H01M 10/613; H01M 10/6556; H01M 50/533; H01M 50/591; H01M 10/0431; H01M 50/103; H01M 50/242; H01M 50/56; H01M 50/224; H01M 50/233; H01M 10/625; H01M 10/6561; H01M 10/6568; Y02E 60/10
See application file for complete search history.

(56) References Cited

U.S. PATENT DOCUMENTS

| | | | | |
|---|---|---|---|---|
| 2011/0293974 A1* | 12/2011 | Yoon | .................. | H01M 10/625 429/72 |
| 2014/0186693 A1* | 7/2014 | Tyler | .................. | H01M 50/103 429/186 |
| 2018/0123159 A1 | 5/2018 | Kim | | |
| 2018/0269545 A1* | 9/2018 | Liu | ........................ | B60L 50/64 |
| 2020/0220128 A1* | 7/2020 | Kim | .................. | H01M 10/625 |

FOREIGN PATENT DOCUMENTS

| | | | | |
|---|---|---|---|---|
| CN | 103107385 A | 5/2013 | | |
| CN | 104900939 A | 9/2015 | | |
| CN | 105390636 A | 3/2016 | | |
| CN | 105609882 A * | 5/2016 | ......... | H01M 10/058 |
| CN | 108198989 A | 6/2018 | | |

OTHER PUBLICATIONS

The International Search Report for PCT Application No. PCT/CN2019/076271, dated Sep. 27, 2019, 10 pages.
The extended European search report for European Application No. 19906551.7, dated Nov. 10, 2021, 9 pages.

\* cited by examiner

*Primary Examiner* — Muhammad S Siddiquee
(74) *Attorney, Agent, or Firm* — Law Offices of Liaoteng Wang (57) ABSTRACT

The embodiments of the present disclosure provide a battery module and a battery pack. A battery module includes: a cooling component; and a battery group, comprising secondary batteries disposed side by side in a first direction and each including a case having an accommodating hole, an electrode assembly disposed in the accommodating hole, and a cap assembly, the electrode assembly including two end faces disposed opposite to each other in a second direction intersecting the first direction and an electrode tab extending from each end face. The secondary batteries each includes two sides opposite to each other in the second direction, the cooling component is disposed on at least one of the two sides, the cooling component and the end face are respectively disposed on two sides of the case in the second direction, and the cooling component is connected and fixed to each of the secondary batteries.

12 Claims, 11 Drawing Sheets

BATTERY MODULE AND BATTERY PACK

CROSS-REFERENCE TO RELATED APPLICATION

The present disclosure is a continuation of International Application No. PCT/CN2019/076271, filed on Feb. 27, 2019, which claims priority to Chinese patent application No. 201811641703.7, titled "Battery Module and Battery Pack" filed on Dec. 29, 2018, both of which are hereby incorporated by reference in their entireties.

TECHNICAL FIELD

The present disclosure relates to the technical field of battery, and in particular to a battery module and a battery pack.

BACKGROUND

With the development of technology, applications of secondary batteries are becoming more and more extensive, involving production or life. The secondary battery is also called as a power battery and is a rechargeable battery. The secondary batteries are widely used. The secondary batteries with a low capacity can be used for a small electric vehicle, while the secondary batteries with a high capacity can be used for a large electric vehicle such as a hybrid vehicle and an electric vehicle. In the case that the secondary batteries are used in a group, a busbar is necessary to connect the secondary batteries in series or in parallel. In general, the busbar is welded to electrodes of the secondary batteries. A battery module includes a plurality of secondary batteries and connecting members for fixing the plurality of secondary batteries. A secondary battery mainly includes a case, an electrode assembly, a current collecting member, and a cap assembly. The electrode assembly is formed by winding or laminating a positive electrode plate, a negative electrode plate and a separator. In the prior art, the secondary battery may produce a large amount of heat in some cases. At present, a heat dissipating structure disposed in the battery module has deteriorate heat dissipating efficiency, so the heat produced by the secondary battery cannot be quickly diffused, thereby adversely affecting the normal operation of the secondary battery.

SUMMARY

The embodiments of the present disclosure provide a battery module and a battery pack. The battery module has good cooling performance itself, and thus the heat produced during the operating process can be quickly diffused to ensure a good operating condition.

On one aspect, an embodiment of the present disclosure provides a battery module, including:

a cooling component; and a battery group, including two or more secondary batteries disposed side by side in a first direction, each secondary battery including a case having an accommodating hole, an electrode assembly disposed in the accommodating hole, and a cap assembly connected with the case in a sealed manner to seal the electrode assembly in the case, the electrode assembly including two end faces disposed opposite to each other in a second direction and an electrode tab extending from each end face, and the first direction intersecting the second direction; wherein the secondary batteries each has two sides opposite to each other in the second direction, the cooling component is disposed on at least one of the two sides, the cooling component and the end face are respectively disposed on two sides of the case in the second direction, and the cooling component is connected and fixed to each of the secondary batteries.

The battery module according to the embodiments of the present disclosure includes a secondary battery and a cooling component for cooling the secondary battery. The secondary battery includes a case and an electrode assembly disposed in the case. An end face and a tab of the electrode assembly are heat generating sources, which easily produce a large amount of heat. The cooling component is disposed outside of the case and corresponding to the end face and the tab of the electrode assembly, so the cooling paths between the cooling component to the end face and the tab are short and thus the cooling and heat dissipating efficiency is high so as to quickly cool the electrode assembly quickly in time, thereby ensuring a smooth and safe operating process of the electrode assembly.

On a further aspect, a battery pack according to an embodiment of the present disclosure, including:

a housing, having an accommodating chamber; and the battery module of the above embodiments, accommodated in the accommodating chamber.

DESCRIPTION OF THE DRAWINGS

Features, advantages, and technical effects of exemplary embodiments of the present disclosure may be described below with reference to accompanying drawings.

In the drawings, the drawings are not drawn to actual scale.

DESCRIPTION OF REFERENCE NUMERALS 10, battery module; 11, cooling component; 11a, plate-shaped body; 11b, cooling channel; 12, battery group; 13, secondary battery; 14, case; 14a, accommodating hole; 14b, first heat conductive part; 14c, second heat conductive part;

140, side wall; 15, electrode assembly; 150, electrode unit; 15a, tab; 15b, first electrode plate; 15c, second electrode plate; 15d, separator; 151, wide face; 152, narrow face; 153, end face; 16, cap assembly; 16a, adapting piece; 17, first end plate; 18, second end plate; 19, buffer gap; 20, battery pack; 21, housing; 21a, accommodating chamber; 98, gap; 99, connection structure; X, first direction; Y, second direction; Z, third direction.

DETAILED DESCRIPTION

Below, embodiments of the present disclosure may be further described in detail in combination with the drawings and embodiments. The following detailed description of the embodiments and the accompanying drawings are used to exemplarily illustrate the principles of the present disclosure and may not limit the scope of the present disclosure, that is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right" and the like is merely for the purpose of describing the present disclosure and simplifying the description, and is not intended to indicate or imply that the device or element referred to must have a specific orientation, is constructed and operated in a specific orientation, and therefore cannot be understood to be a limitation of the present disclosure. Moreover, the terms "first", "second", and the like are used for descriptive purposes only and cannot be understood to indicate or imply relative importance.

In the description of the present disclosure, it should also be noted that, unless otherwise specified and defined, the terms "install", "couple", and "connect" are to be understood broadly, and may be, for example, a fixed connection, a disassemble connection, or an integral connection; they can be coupled directly or indirectly by an intermediate medium. The specific meaning of the above terms in the present disclosure can be understood by the person skilled in the art according to specific circumstance.

For better understanding the present disclosure, a battery module and a secondary battery according to embodiments of the present disclosure may be described in detail below in combination with FIGS. 1 to 11.

Figure 1:
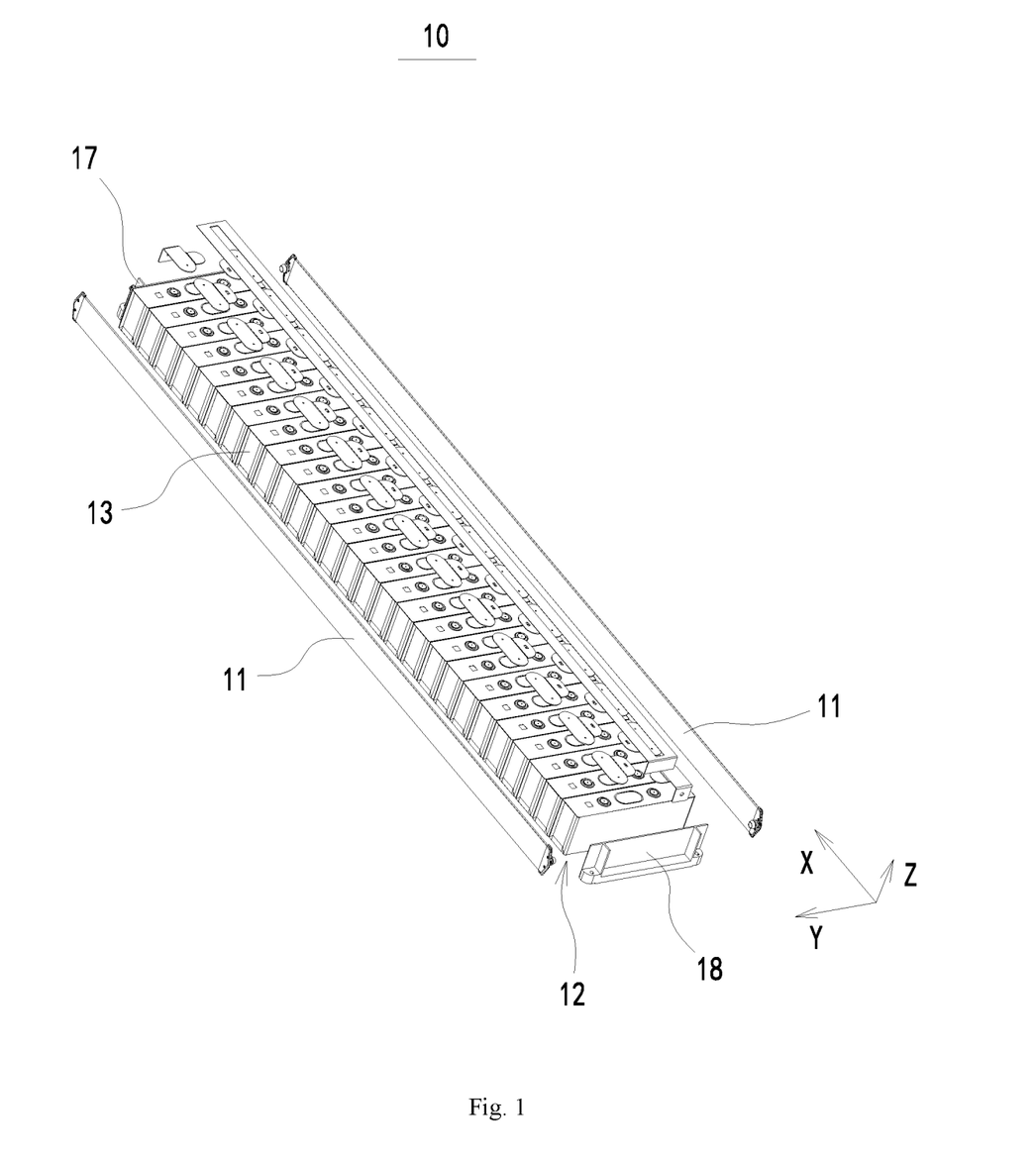
FIG. 1 is a schematic view of an exploded structure of a battery module according to an embodiment of the present disclosure.

As shown in FIG. 1, an embodiment of the present disclosure provides a battery module 10 including two or more secondary batteries 13 of the present embodiment and a busbar for connecting two secondary batteries 13. The two or more secondary batteries 13 are disposed side by side in a first direction X. One end of the busbar is connected and fixed to one of the two secondary batteries 13, and the other end of the busbar is connected and fixed to the other secondary battery 13. In an example, the secondary battery 13 of the present embodiment is a hard-shell battery.

Figure 2:
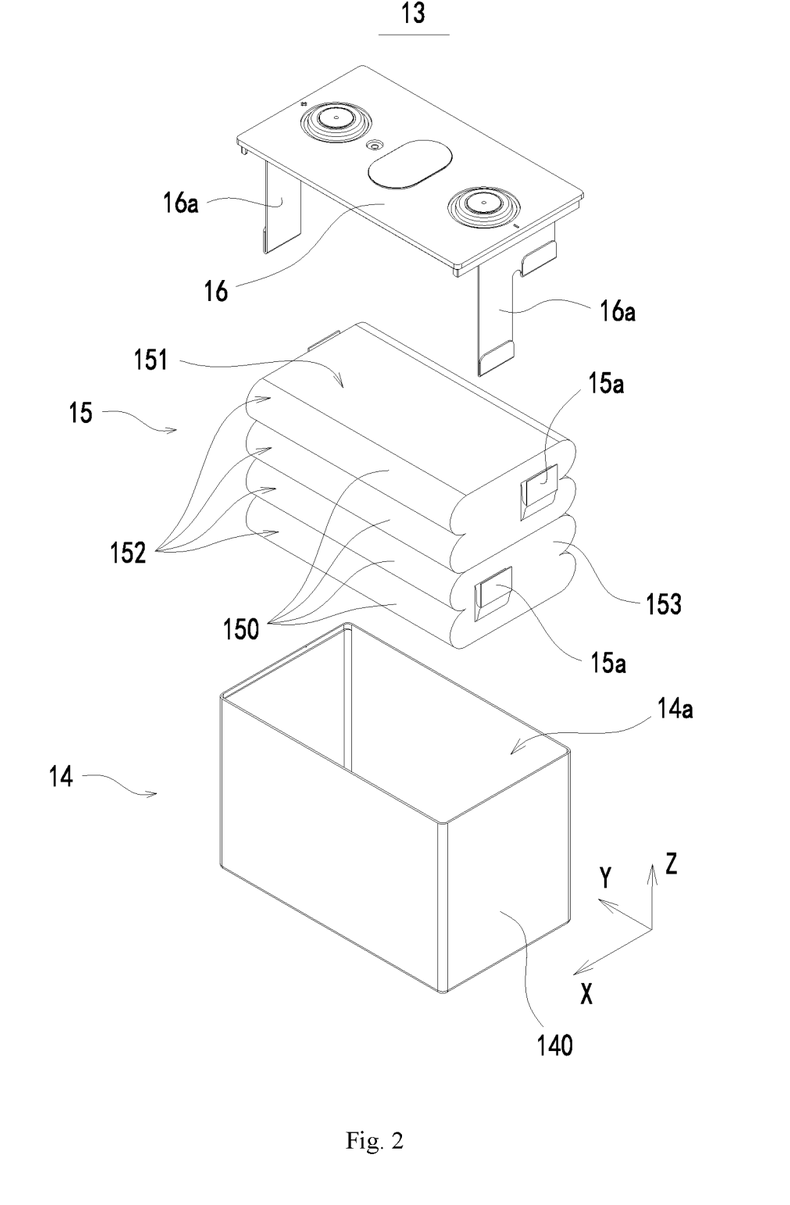
FIG. 2 is a schematic view of an exploded structure of a secondary battery according to an embodiment of the present disclosure.

As shown in FIG. 2, the secondary battery 13 of the present embodiment includes a case 14 having an accommodating hole 14a, an electrode assembly 15 disposed in the accommodating hole 14a, and a cap assembly 16 connected with the case 14 in a sealed manner to seal the electrode assembly 15 in the case 14.

The case 14 of the present embodiment may be in a shape of quadrangular prism or in other shapes. The case 14 has an internal space for accommodating the electrode assembly 15 and electrolyte. The case 14 can be made of a material such as aluminum, aluminum alloy, and plastic.

Figure 3:
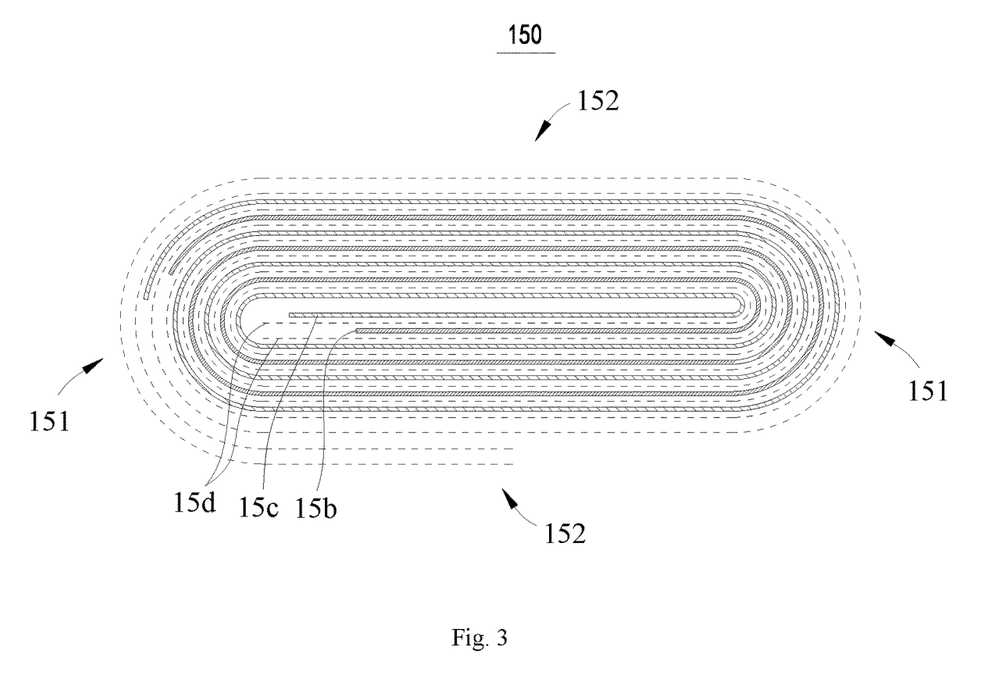
FIG. 3 is a schematic cross-sectional view of a structure of an electrode unit according to an embodiment of the present disclosure.

As shown in FIGS. 2 and 3, the electrode assembly 15 of the present embodiment includes two or more electrode units 150. The electrode unit 150 of the present embodiment has end faces 153 and tabs 15 extending outwardly from each end face 153. The electrode unit 150 of the present embodiment can be formed by winding a first electrode plate 15b, a second electrode plate 15c, and a separator 14d together. The separator 14d is an insulator interposed between the first electrode plate 15b and the second electrode plate 15c. The electrode unit 150 of the present embodiment includes a layer of separator 14d, a layer of first electrode plate 15b, a layer of separator 14d, and a layer of second electrode plate 15c. In the present embodiment, the description is made by exemplarily taking the first electrode plate 15a as a positive electrode plate and taking the second electrode plate 15c as a negative electrode plate. Alternatively, in other embodiments, the first electrode plate 15b may be a negative electrode plate, while the second electrode plate 15c is a positive electrode plate. Further, a positive electrode active material is coated on a coated region of the positive electrode plate, while a negative electrode active material is coated on a coated region of the negative electrode plate. An uncoated region extending from a body portion serves as the tab 15a, the electrode unit 150 includes two tabs 15a, a positive tab and a negative tab, and the positive tab is formed by stacking a plurality of uncoated regions extending from the coated regions of the positive electrode plates; the negative tab is formed by stacking a plurality of uncoated regions extending from the coated regions of the negative electrode plates. Optionally, the electrode unit 150 of the present embodiment has a capacity of 100 Ah to 180 Ah.

The electrode assembly 15 of the present embodiment includes two tabs 15a and two end faces 153, the tab 15a and the end face 153 being disposed opposite to each other in a second direction Y. One tab 15a extends from each end face 153 in the second direction Y The first direction X intersects the second direction Y. In an embodiment, the tabs 15a of all electrode units 150 connect together and form the tab 15a of the electrode assembly 15. The end face 153 of the electrode assembly 15 includes the end faces 153 of all the electrode units 150. In an example, the end face 153 is a winding end face.

As shown in FIG. 1, the battery module 10 of the present embodiment includes a cooling component 11 and a battery group 12. The battery group 12 includes two or more secondary batteries 13. The two or more secondary batteries 13 are disposed side by side in the first direction X. The secondary battery 13 includes two sides opposite to each other in the second direction Y. The cooling component 11 is disposed on at least one of the two sides. The cooling component 11 and the end face 153 are respectively disposed on an inner side and an outer side of the case 14 in the second direction Y, and the cooling component 11 is connected and fixed to the case 14 of each secondary battery 13. The cooling component 11 is disposed on the outer side of the case 14. When the secondary battery 13 of the present embodiment is operating normally, the end face 153 and the tab 15a produce a large amount of heat, which can easily cause breakage of the tab 15a. The cooling component 11 of the present embodiment is disposed directly corresponding to the end face 153 and the tab 15a of the electrode assembly 15, so the heat produced by the end face 153 and the tab 15a may be diffused in time and conducted to the case 14, then conducted to the external cooling component 11 through the case 14, and finally conducted to the outside battery module 10 by the cooling component 11 in time. The manner of disposing the cooling component 11 to correspond to the end face 153 and the tab 15a of the electrode assembly 15 of the present embodiment can greatly shorten the cooling path and effectively improve the cooling and heat dissipating efficiency.

Figure 6:
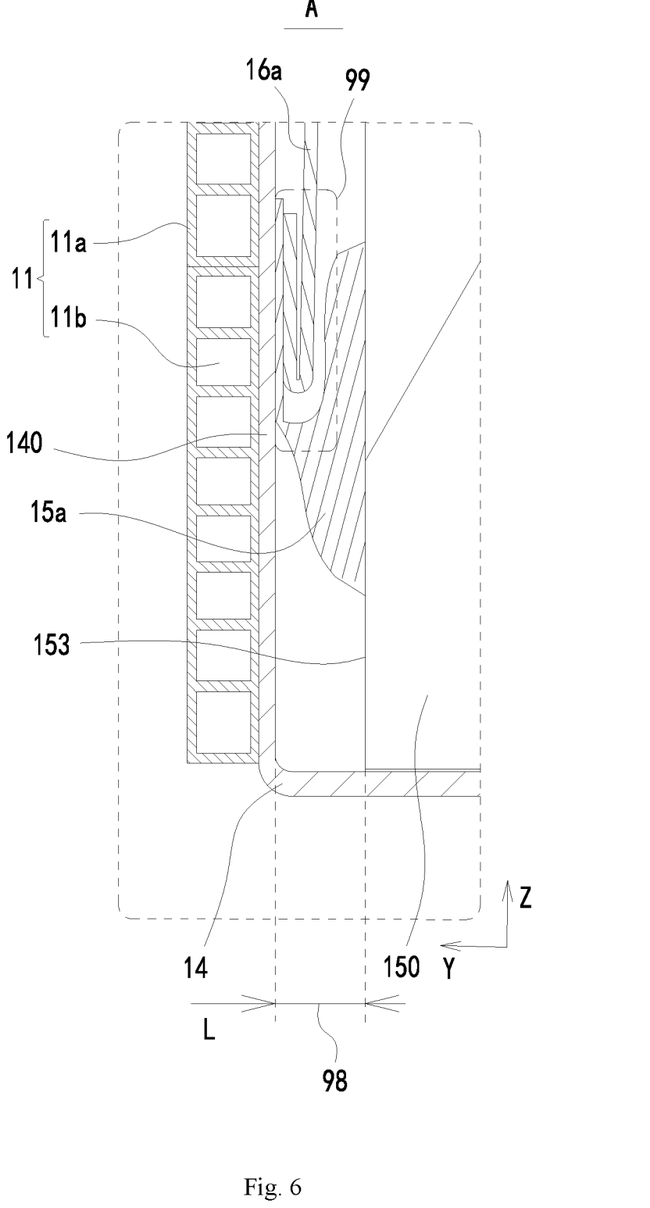
FIG. 6 is an enlarged view of A in FIG. 5.

As shown in FIG. 6, the case 14 of an embodiment of the present disclosure includes a side wall 140, and a first heat conductive part 14b is disposed on the outer side of the side wall 140. The cooling component 11 is connected and fixed to the side wall 140 by the first heat conductive part 14b. The first heat conductive part 14b disposed between the side wall 140 and the cooling component 11 can be filled in a space between the cooling component 11 and the side wall 140. The first heat conductive part 14b can effectively avoid a slit occurring between the cooling component 11 and the side wall 140, thereby ensuring a tight combination of the side wall 140 of the case 14 and the cooling component 11, so heat can be quickly conducted to the cooling component 11 through the first heat conductive part 14b. Optionally, the material of the first heat conductive part 14b of the present embodiment may be a material such as silica gel and rubber. The case 14 of the present embodiment further includes a bottom wall connected with the side wall 140. The bottom wall is disposed corresponding to the cap assembly 16 in an axial direction. Optionally, the monolithic material of the case 14 of the present embodiment is a metal material such as stainless steel, aluminum, and aluminum alloy, which is beneficial to improve heat transfer efficiency.

In an embodiment, an area of a region for connecting the side wall 140 with the cooling component 11 is A, and a thickness of the side wall 140 is B, wherein a ratio of A to B is 15 cm$^2$/0.05 cm~60 cm$^2$/0.15 cm. The heat transfer efficiency of the cooling component 11 and the side wall 140 can be balanced with the dynamic performance of the electrode assembly 15 by limiting the ratio of A/B within a certain range. In the case that the value of A/B is less than or equal to 15 cm$^2$/0.05 cm, the area A of the connection region is small and the thickness B of the first heat conductive part 14b is large, as a result, the heat transfer effect and the connection strength between the cooling component 11 and the side wall 140 are deteriorate in this case; in the case that the value of A/B is larger than or equal to 60 cm$^2$/0.15 cm, the area A of the connection region is large and the thickness B of the side wall 140 is small, as a result, in this case, a volume of the first heat conductive part 14b is large, so when the secondary battery 13 expands, the first heat conductive part 14b can easily cause cycle diving of the secondary battery 13 and the deformation caused by the expansion is large due to small thickness B of the side wall 140, thereby easily reducing the cycle performance of the secondary battery 13.

In an embodiment, the thickness of the side wall 140 is 0.5 mm to 1.5 mm. During the use of the secondary battery 13, gas may be produced inside the electrode unit 150, thereby causing an increase in pressure inside the case 14. In the case that the air pressure inside the case 14 reaches a certain pressure intensity, the side wall 140 may be deformed and bulged outwardly. In the case that the thickness of the side wall 140 is less than 0.5 mm, the side wall 140 is easily deformed, thereby causing the bulged side wall 140 and the cooling component 11 to be separated from each other and thus a gap occurs between them, or causing the bulged side wall 140 and the first heat conductive parts 14b to be separated from each other and thus a gap occurs between them, which severely reduces the cooling efficiency. In the case that the thickness of the side wall 140 is larger than 1.5 mm, since the thickness of the side wall 140 is large, the side wall 140 occupies so much space that the dimension of the secondary battery 13 is large, therefore reducing the energy density of the secondary battery 13. Further, since the thickness of the side wall 140 is large, the heat transfer performance of the wall 140 is deteriorate, therefore severely affecting the cooling efficiency.

In an embodiment, as shown in FIG. 6, there is a gap 98 between the side wall 140 and the end face 153. The dimension L of the gap 98 is 0.3 mm to 0.9 mm. In a high temperature environment, high temperature gas is produced inside the electrode unit 150, is mainly discharged from the end face 153 of the electrode unit 150 into the case 14, and meanwhile may impose an instantaneous high temperature impact force on the side wall 140, therefore easily causing the side wall 140 to be damaged or melted. The gap 98 between the side wall 140 and the end face 153 can be used to buffer the impact force of the high temperature gas released from an interior of the electrode unit 150 on the side wall 140, so the possibility of damage or melt of the side wall 140 is reduced, therefore improving the safety of the secondary battery 13 during use. In the case of the dimension L less than 0.3 mm, the gap 98 has lower buffering effect on the high temperature gas released from the interior of the electrode unit 150 and cannot effectively exert a buffering function, so the high temperature gas may easily damage the side wall 140, therefore affecting the cooling of the secondary battery 13. In the case of the dimension L larger than 0.9 mm, the gap 98 between the electrode unit 150 and the side wall 140 may be so large that the dimension of the entire secondary battery 13 becomes large, which adversely affects the energy density of the secondary battery 13, and further, in this case, a perpendicular distance between the end face 153 of the electrode unit 150 and the cooling component 11 is large, which causes the deterioration of the heat conductive performance of the gap 98 and thus severely reduces the cooling efficiency and cooling effect.

Figure 4:
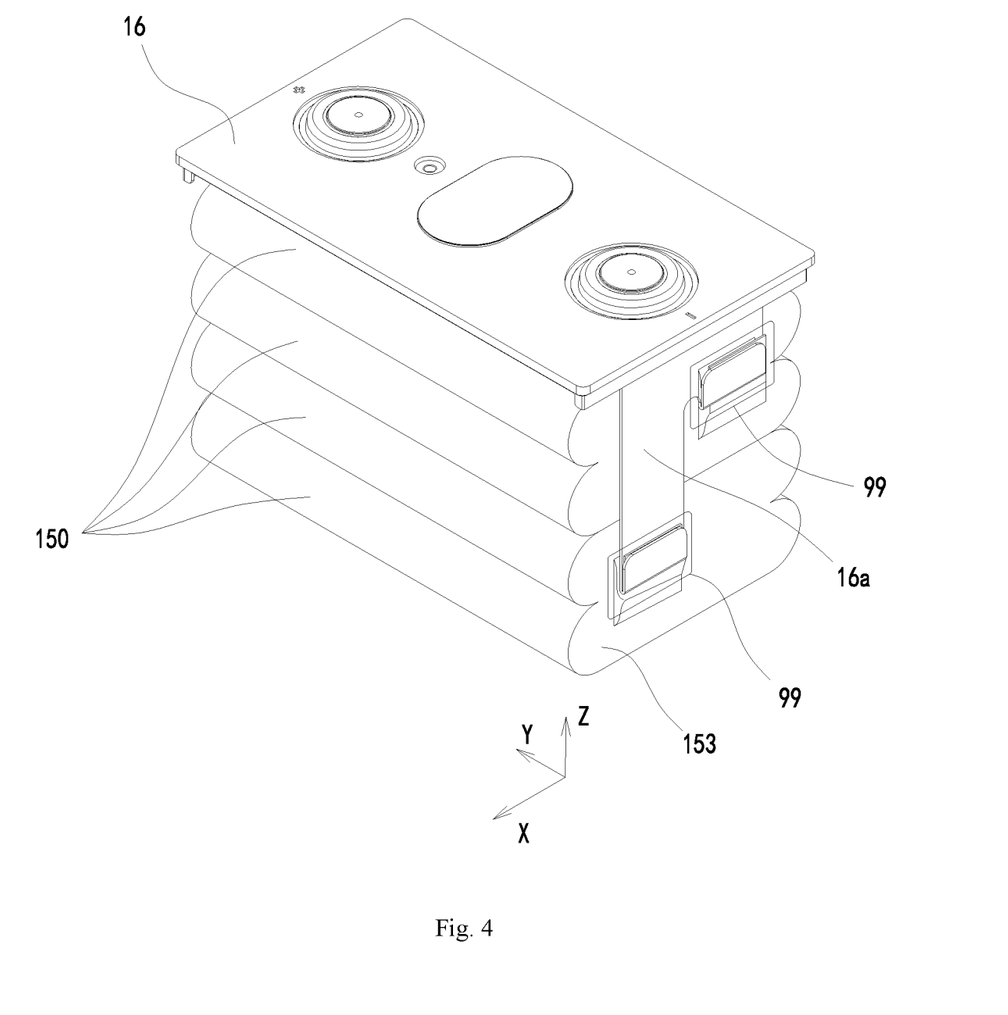
FIG. 4 is a schematic view of a partial structure of a secondary battery according to an embodiment of the present disclosure.

As shown in FIG. 4, the cap assembly 16 of an embodiment of the present disclosure includes an adapting piece 16a connected with the tab 15a. The region where the adapting piece 16a and the tab 15a connect forms a connection structure 99. During the use of the secondary battery 13, the connection structure 99 formed by the tab 15a and the adapting piece 16a may produce a large amount of heat. If the heat cannot be dissipated in time, the tab 15a or the adapting piece 16a may be damaged or melted, and in severe cases, the secondary battery 13 may fail. The case 14 of the present embodiment includes a side wall 140 and a second heat conductive part 14c. The second heat conductive part 14c is disposed between the side wall 140 and the connection structure 99. The second heat conductive part 14c disposed between the side wall 140 and the connection structure 99 can be filled in a space between the side wall 140 and the connection structure 99, thereby ensuring a tight combination between the side wall 140 and the connection structure 99. The second heat conductive part 14c can effectively avoid a slit occurring between the side wall 140 and the connection structure 99, so the heat is quickly conducted from the connection structure 99 to the side wall 140 through the second heat conductive part 14c, thereby improving the cooling efficiency. Optionally, the material of the second heat conductive part 14c of the present embodiment may be a material such as silica gel and rubber. In an embodiment, the case 14 includes both a first heat conductive part 14b and a second heat conductive part 14c.

Figure 8:
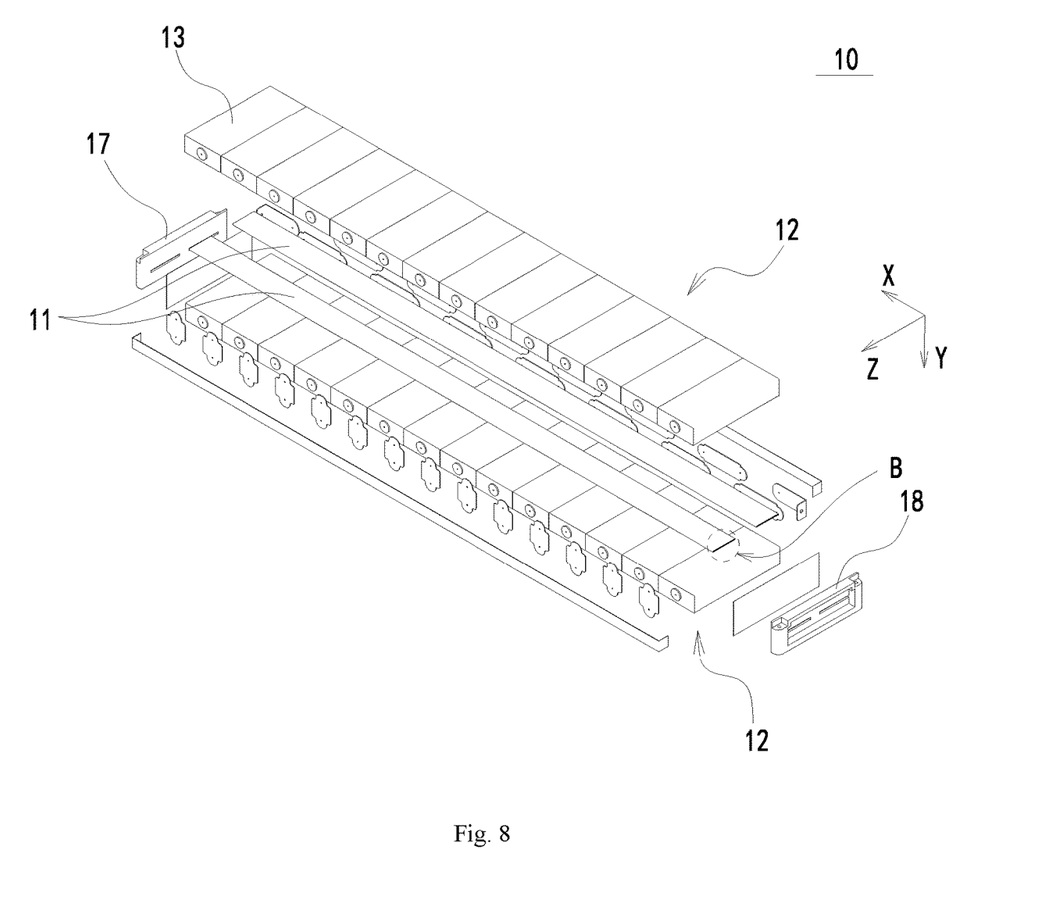
FIG. 8 is a schematic view of an exploded structure of a battery module according to a further embodiment of the present disclosure.

As shown in FIG. 8, the battery module 10 includes two or more battery groups 12 of an embodiment of the present disclosure. The two or more battery groups 12 are disposed side by side in the second direction Y. The cooling component 11 is disposed between two adjacent battery groups 12. The two adjacent battery groups 12 can be cooled by the cooling component 11 simultaneously, so as to improve the cooling efficiency and meanwhile to effectively reduce the possibility of excessive operating environment temperature of the secondary battery 13 due to heat accumulation occurring between the two adjacent battery groups 12, thereby improving the safety and operating stability of the secondary battery 13 during use.

The battery module 10 of an embodiment of the present disclosure further includes a first end plate 17 and a second end plate 18. The first end plate 17 and the second end plate 18 are spaced apart in the first direction X. The battery group 12 is disposed between the first end plate 17 and the second end plate 18. The first end plate 17 and the second end plate 18 are respectively connected with the cooling component 11 to apply a clamping force in the first direction X to the battery group 12. The cooling component 11 of the present embodiment not only achieves the function of cooling, but also achieves the function of connecting, and thus the first end plate 17 and the second end plate 18 are connected without the use of an additional connection component, therefore effectively reducing the number of parts used.

Figure 5:
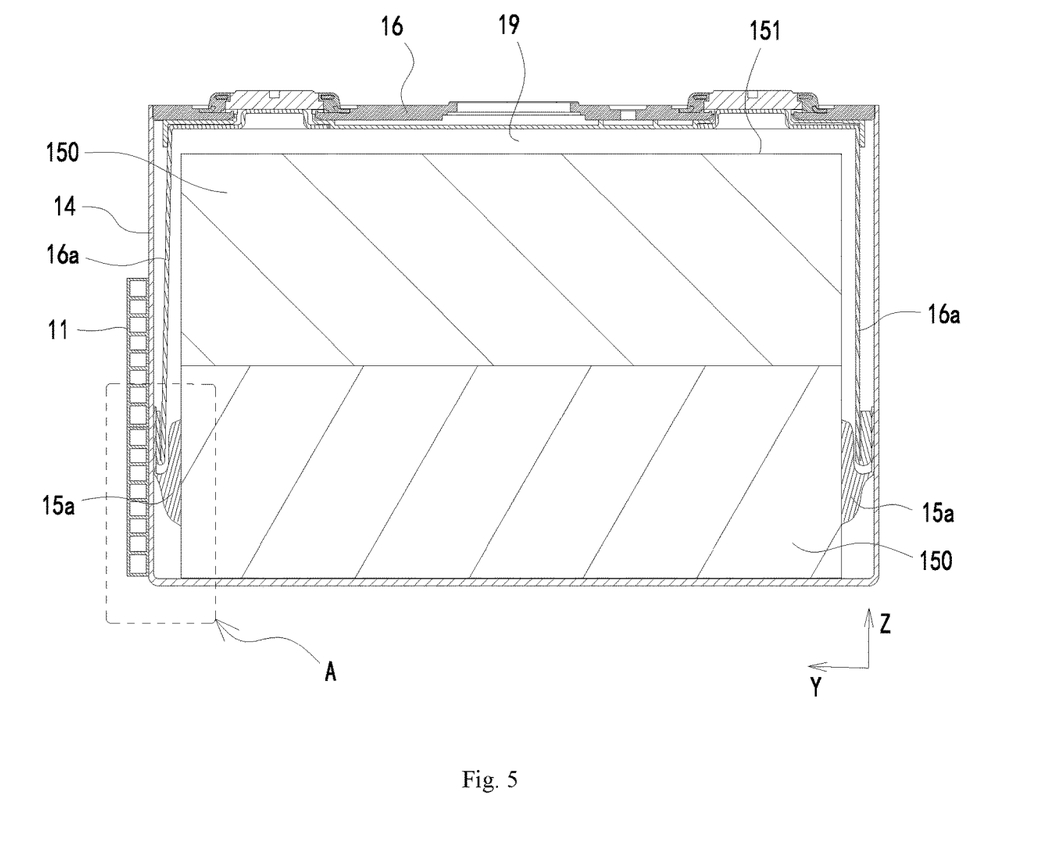
FIG. 5 is a schematic cross-sectional view of a structure of a secondary battery according to an embodiment of the present disclosure.

As shown in FIG. 5, the two or more electrode units 150 of an embodiment of the present disclosure are stacked in a third direction Z. The accommodating hole 14a extends in the third direction Z, and the first direction X and the second direction Y are respectively perpendicular to the third direction Z. The first direction X and the second direction Y are respectively perpendicular to the axial direction Z of the accommodating hole 14a. The cooling component 11 of the present embodiment is disposed on a side of the case 14 and can correspond to the end faces 153 and the tabs 15a of all the electrode units 150, so all the electrode units 150 can be cooled simultaneously and thus each electrode unit 150 is ensured to cool in conformance with each other, thereby effectively improving the service life of the secondary battery 13. If the cooling component 11 is disposed at the bottom of the case 14, only the lower electrode unit 150 can be effectively cooled, while the cooling effect on the upper electrode unit 150 close to the cap assembly 16 is deteriorate, thereby causing an inconsistent cooling effect on each electrode unit 150.

In an embodiment, the electrode unit 150 is in a flat shape. The electrode unit 150 has a wide face 151 and a narrow face 152, and the wide face 151 of the electrode unit 150 faces the cap assembly 16, so in the case of the accommodating hole 14a in the case 14 having an unchanged volume, a larger number of electrode units 150 can be disposed in the case 14 to effectively increase the energy density of the secondary battery 13. Further, when expanding, the electrode unit 150 of the present embodiment expands primarily in the axial direction Z of the accommodating hole 14a, and thus can release an expansion force in the axial direction Z of the accommodating hole 14a. In the case that the two or more secondary batteries 13 of the present embodiment are disposed side by side in the first direction X, the main expansion force produced by the expansion of each secondary battery 13 will not accumulate and thus form a large combined force in the first direction since the main expansion force produced by each secondary battery 13 intersects with the first direction X. In this way, in the case that the battery module 10 including the two or more secondary batteries 13 of the present embodiment is fixed by using the first end plate 17 and the second end plate 18, the requirements on rigidity and strength of the first end plate 17 and the second end plate themselves can be reduced, which is beneficial to reduce the volume or weight of the first end plate 17 and the second end plate 18, and further is beneficial to increase energy density and space utilization of the entire secondary battery 13 and the battery module 10. Optionally, Young's modulus of the first end plate 17 and the second end plate 18 is both less than 30 GPa. Since the expansion force of each secondary battery 13 included in the battery module 10 of the present embodiment in the first direction X is small, the thicknesses of the first end plate 17 and the second end plate 18 in the first direction X can be designed to be small and the requirements on rigidity and strength of the first end plate 17 and the second end plate themselves can also be reduced, which is beneficial to reducing the weight of the first end plate 17 and the second end plate 18 and to increasing the energy density of the secondary battery 13 and the battery module 10, so the limitations on the materials of the first end plate 17 and the second end plate 18 are reduced simultaneously and thus a wider range of material choice is allowed, thereby reducing the manufacturing difficulty and cost.

Figure 7:
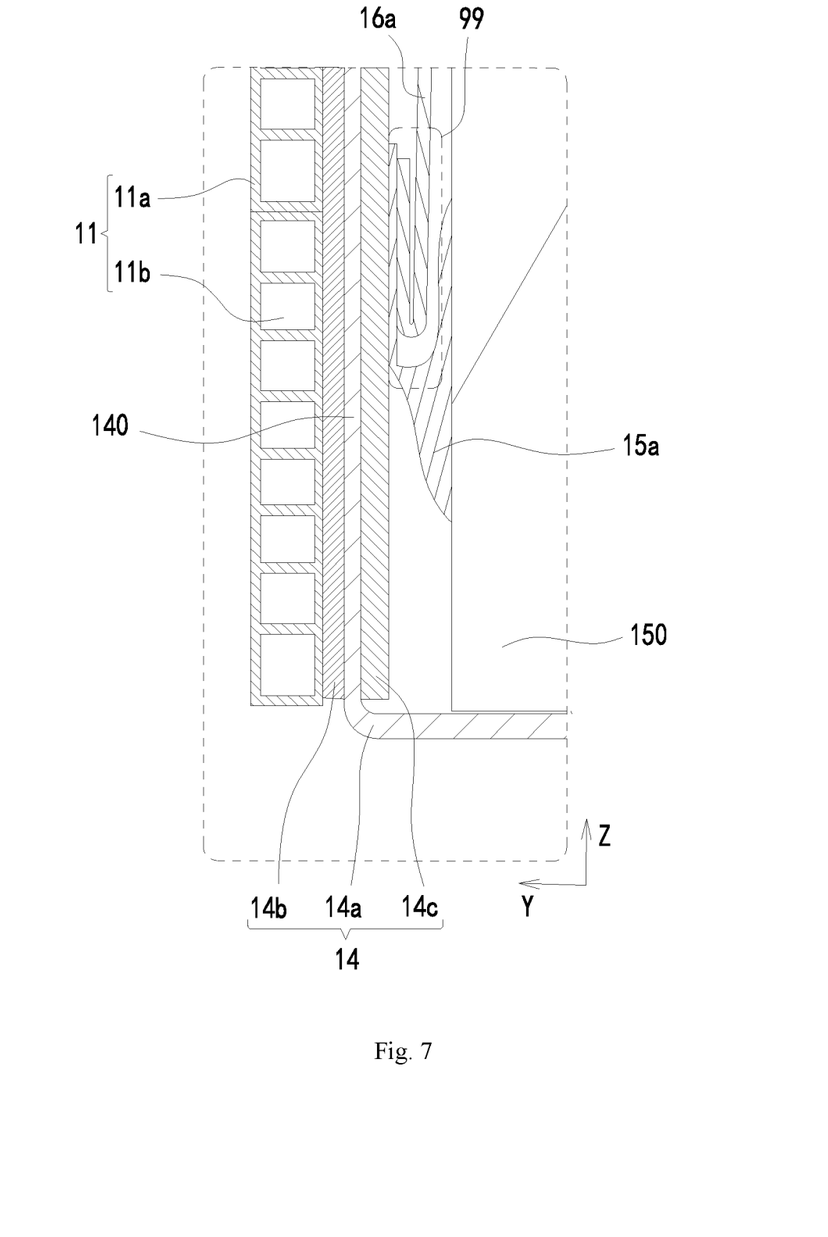
FIG. 7 is a schematic view of a partial structure of a secondary battery according to a further embodiment of the present disclosure.
Figure 9:
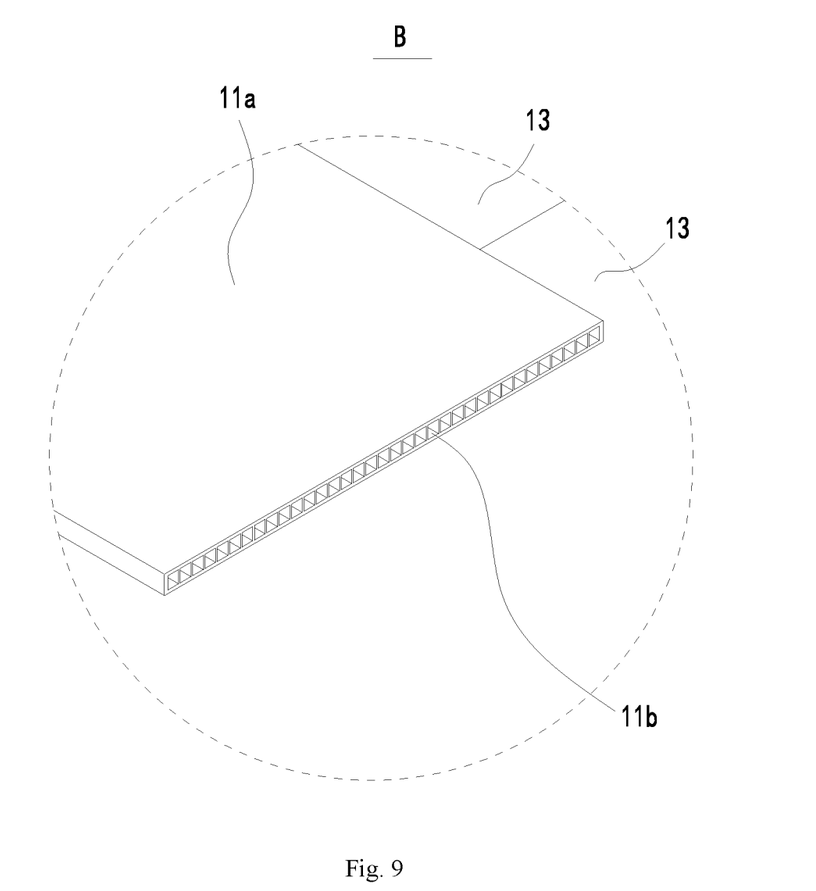
FIG. 9 is an enlarged view of B in FIG. 8.

As shown in FIG. 7 or 9, the cooling component 11 of an embodiment of the present disclosure includes a plate-shaped body 11a and cooling channels 11b disposed in the plate-shaped body 11a. The plate-shaped body 11a is in contact with the case 14. The plate-shaped body 11a can increase the contact area with the case 14, which is beneficial to improve the cooling efficiency. In an embodiment, a gaseous cooling medium or a liquid cooling medium can be filled in the cooling channel 11b of the cooling component 11. In some embodiments, the gaseous cooling medium can be filled in the cooling channel 11b of the cooling component 11, so when leaking, the gaseous cooling medium may not contaminate other parts, thereby improving the safety of the secondary battery 13 during use.

As shown in FIG. 5, the cap assembly 16 of an embodiment of the present disclosure is spaced apart from the adjacent electrode assembly 15 to form a buffer gap 19. The buffer gap 19 is used to buffer an amount of all expansion and deformation of the electrode assembly 15. The buffer gap 19 is used to buffer an amount of a portion of expansion and deformation of the electrode assembly 15. When at least one electrode unit 150 of the electrode units 150 included in the electrode assembly 15 adversely expands, the height of the entire electrode assembly 15 increases. However, since the electrode assembly 15 is restrained by a base plate, the electrode assembly 15 mainly expands toward the cap assembly 16, so the expanding electrode assembly 15 may invade the buffer gap 19, but will not directly come into contact the cap assembly 16 and impose a compressive force to the cap assembly 16. In this way, when expanding, the electrode assembly 15 will not impose an excessive compressive force to the cap assembly 16 to cause the cap assembly 16 to be disconnected from the case 14, so a case of leakage of the electrolyte is avoided, thereby ensuring the structural integrity and safety of the secondary battery 13.

The battery module 10 of an embodiment of the present disclosure includes secondary batteries 13 and a cooling component 11 for cooling the secondary batteries 13. The secondary battery 13 includes a case 14 and an electrode assembly 15 disposed in the case 14. An end face 153 and a tab 15a of the electrode assembly 15 are heat generating sources, which easily produce a large amount of heat. A cooling component 11 is disposed outside of the case 14 and corresponding to the end face 153 and the tab 15a of the electrode assembly 15, so cooling paths between the cooling component 11 to the end face 153 and the tab 15a are short and thus the cooling and heat dissipating efficiency is high to quickly cool the electrode assembly 15 in time, thereby ensuring a smooth and safe operating process of the electrode assembly 15.

Figure 10:
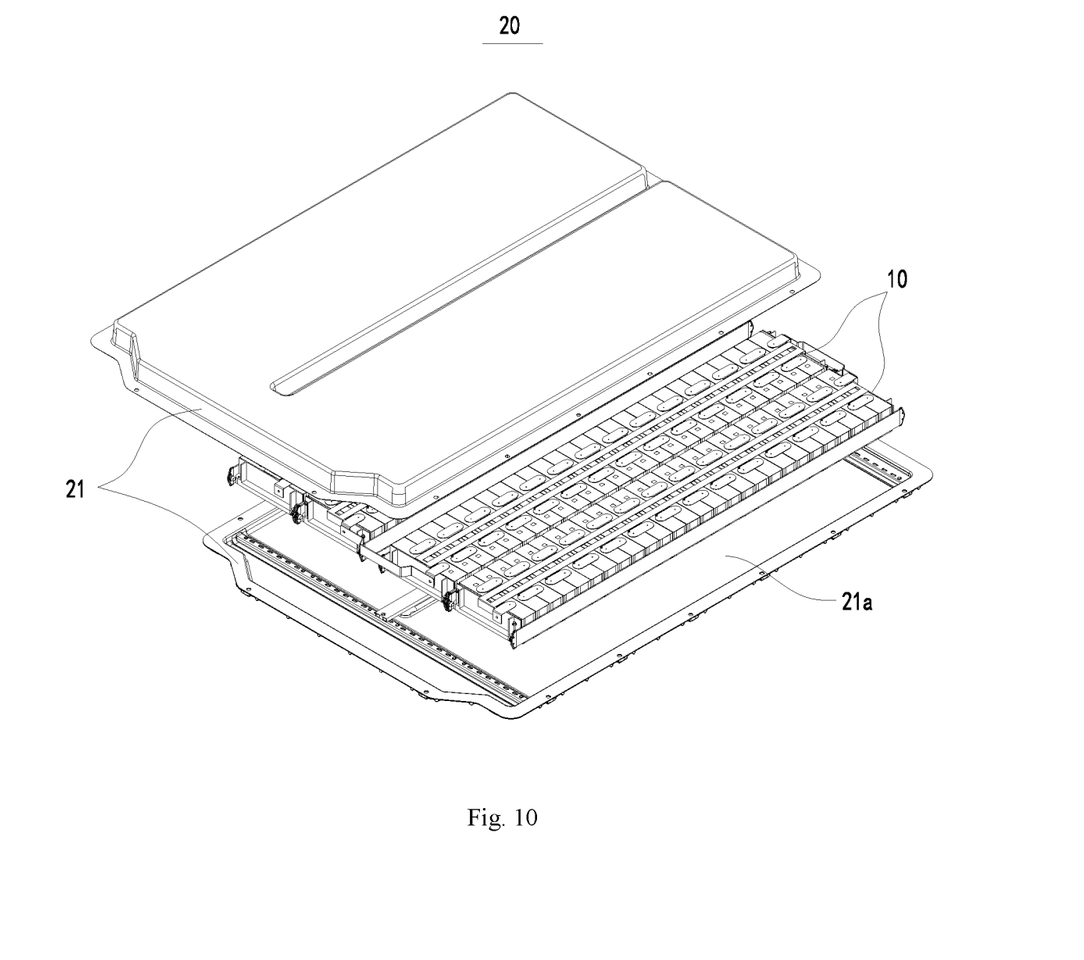
FIG. 10 is a schematic view of an exploded structure of a battery pack according to an embodiment of the present disclosure.
Figure 11:
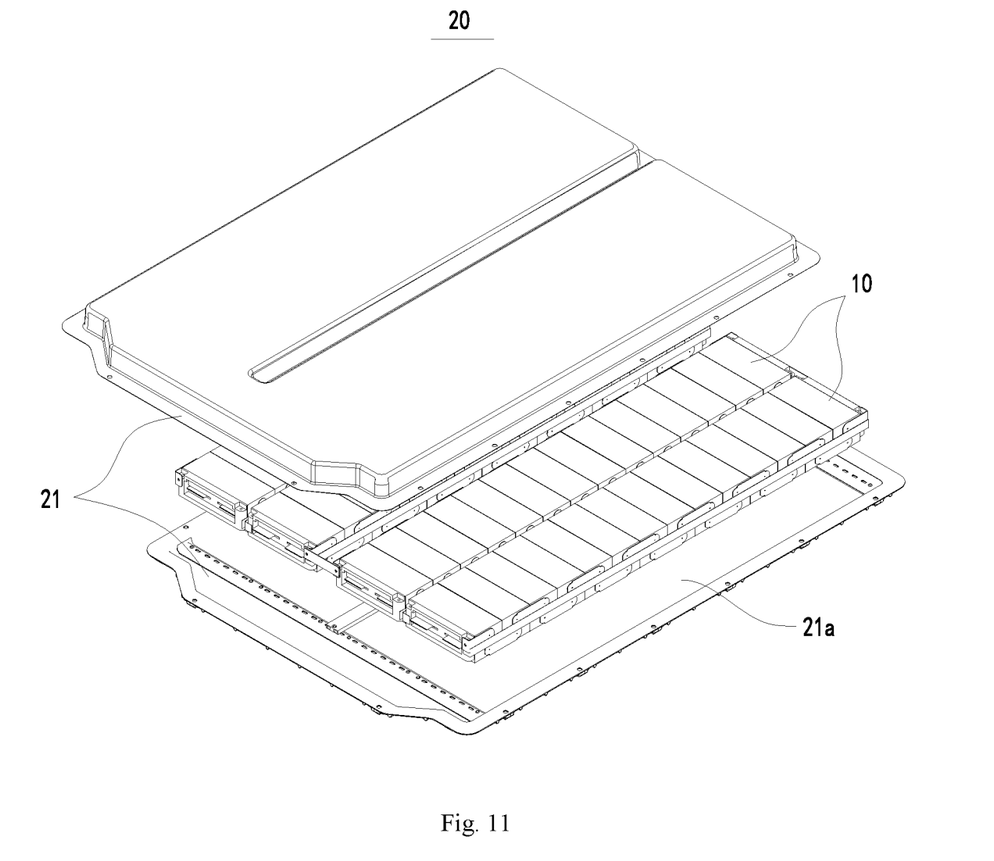
FIG. 11 is a schematic view of an exploded structure of a battery pack according to a further embodiment of the present disclosure.

As shown in FIGS. 10 and 11, an embodiment of the present disclosure also provides a battery pack 20. The battery pack 20 of the present embodiment includes a housing 21 and a battery module 10 of the above embodiments. The housing 21 of the present embodiment has an accommodation chamber 21a for accommodating the battery module 10. One or two or more battery modules 10 are accommodated in the accommodating chamber 21a. The battery module 10 included in the battery pack 20 of an embodiment of the present disclosure has good heat dissipating performance itself, which can ensure that its temperature is a normal operating temperature and thus the electrical performance and the safety of the battery module 10 during use are effectively improved.

Although the present disclosure has been described with reference to the preferred embodiments, various modifications may be made to the present disclosure and components in the present disclosure may be replaced with equivalents without departing from the scope of the present disclosure. Particularly, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery module, comprising:
a cooling component; and a plurality of secondary batteries which are combined to a battery group and disposed side by side in a first direction,
wherein the secondary battery comprises a case provided with an accommodating hole, an electrode assembly is disposed in the accommodating hole, and a cap assembly is connected with the case in a sealed manner to seal the electrode assembly in the case, wherein the electrode assembly comprises an end face in a second direction, and an electrode tab is extending from the end face, and the first direction intersects the second direction, and
wherein the secondary battery comprises two sides opposite to each other in the second direction, the cooling component is disposed on at least one of the two sides, the cooling component and the end face are respectively disposed on two sides of the case in the second direction, and the cooling component is connected and fixed to each of the plurality of secondary batteries,
wherein the case comprises a side wall, and the cooling component is connected and fixed to the side wall by a first heat conductive part, and
wherein an area of a region of the side wall for connecting with the cooling component is A, a thickness of the side wall is B, and a ratio of A to B is 15 cm2/0.05 cm~60 cm2/0.15 cm.

2. The battery module according to claim 1, wherein the thickness of the side wall is 0.5 mm to 1.5 mm.

3. The battery module according to claim 1, wherein there is a gap between the side wall and the end face, and a dimension of the gap is 0.3 mm to 0.9 mm.

4. The battery module according to claim 1, wherein when a number of the battery groups is two or more, the two or more battery groups are disposed side by side in the second direction, and wherein the cooling component is disposed between adjacent two battery groups of the two or more battery groups.

5. The battery module according to claim 1, wherein the battery module further comprises a first end plate and a second end plate spaced apart in the first direction, the battery group is disposed between the first end plate and the second end plate, and the first end plate and the second end plate are respectively connected with the cooling component to apply a clamping force in the first direction to the battery group.

6. The battery module according to claim 1, wherein the electrode assembly comprises two or more electrode units, each electrode unit of the two or more electrode units comprises a first electrode plate, a second electrode plate, and a separator, wherein the two or more electrode units are stacked in a third direction, and wherein the accommodating hole extends in the third direction, and the first direction and the second direction are respectively perpendicular to the third direction.

7. The battery module according to claim 6, wherein the each electrode unit of the two or more electrode units is in a flat shape and comprises a wide face and a narrow face, and the wide face of the electrode unit faces the cap assembly.

8. The battery module according to claim 7, wherein the cap assembly is spaced apart from the adjacent electrode assembly to form a buffer gap for buffering an amount of all expansion and deformation of the electrode assembly.

9. The battery module according to claim 1, wherein the cooling component comprises a plate-shaped body and cooling channels disposed in the plate-shaped body, and the plate-shaped body is in contact with the case.

10. A battery pack, comprising:
a housing, comprising an accommodating chamber; and
a battery module, which is accommodated in the accommodating chamber and comprises a cooling component; and a plurality of the secondary batteries which are combined to a battery group and disposed side by side in a first direction,
wherein the secondary battery comprises a case provided with an accommodating hole, an electrode assembly is disposed in the accommodating hole, and a cap assembly is connected with the case in a sealed manner to seal the electrode assembly in the case, wherein the electrode assembly comprises an end face in a second direction, and an electrode tab is extending from the end face, and the first direction intersects the second direction, and
wherein the secondary battery comprises two sides opposite to each other in the second direction, the cooling component is disposed on at least one of the two sides, the cooling component and the end face are respectively disposed on two sides of the case in the second direction, and the cooling component is connected and fixed to each of the plurality of secondary batteries,
wherein the case comprises a side wall, and the cooling component is connected and fixed to the side wall by a first heat conductive part, and
wherein an area of a region of the side wall for connecting with the cooling component is A, a thickness of the side wall is B, and a ratio of A to B is 15 cm2/0.05 cm~60 cm2/0.15 cm.

11. The battery module according to claim 10, wherein when a number of the battery groups is two or more, the two or more battery groups are disposed side by side in the second direction, and wherein the cooling component is disposed between adjacent two battery groups of the two or more battery groups.

12. The battery module according to claim 10, wherein the battery module further comprises a first end plate and a second end plate spaced apart in the first direction, the battery group is disposed between the first end plate and the second end plate, and the first end plate and the second end plate are respectively connected with the cooling component to apply a clamping force in the first direction to the battery group.

* * * * *